United States Patent
Huang

(10) Patent No.: US 9,942,111 B2
(45) Date of Patent: Apr. 10, 2018

(54) METHOD FOR REMOTELY ACQUIRING IN REAL TIME LOG

(71) Applicant: ZTE Corporation, Shenzhen, Guangdong (CN)

(72) Inventor: Liang Huang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 371 days.

(21) Appl. No.: 14/646,507

(22) PCT Filed: Sep. 10, 2013

(86) PCT No.: PCT/CN2013/083247
§ 371 (c)(1),
(2) Date: Jun. 12, 2015

(87) PCT Pub. No.: WO2014/079262
PCT Pub. Date: May 30, 2014

(65) Prior Publication Data
US 2015/0304179 A1 Oct. 22, 2015

(30) Foreign Application Priority Data

Nov. 21, 2012 (CN) .......................... 2012 1 0475405

(51) Int. Cl.
*H04L 12/26* (2006.01)
*H04L 12/24* (2006.01)
(Continued)

(52) U.S. Cl.
CPC .......... *H04L 43/04* (2013.01); *H04L 41/0206* (2013.01); *H04L 43/06* (2013.01);
(Continued)

(58) Field of Classification Search
CPC ... H04L 43/04; H04L 61/256; H04L 61/6063; H04L 43/06; H04L 41/0206;
(Continued)

(56) References Cited

U.S. PATENT DOCUMENTS 6,470,388 B1 * 10/2002 Niemi ................. G06F 11/3476
709/223
7,305,697 B2 12/2007 Alao
(Continued)

FOREIGN PATENT DOCUMENTS

CN 101047554 A 10/2007
CN 101098247 A 1/2008
(Continued)

OTHER PUBLICATIONS

International Search Report in international application No. PCT/CN2013/083247, dated Dec. 19, 2013.
(Continued)

*Primary Examiner* — Arvin Eskandarnia
*Assistant Examiner* — Javier O Guzman
(74) *Attorney, Agent, or Firm* — Oppedahl Patent Law Firm LLC

(57) ABSTRACT

Disclosed are a method and system for remotely acquiring in real time a log, and the method includes: when a log server IQAS triggers acquisition of the log, the IQAS issues a log acquisition message to an Access Control Server (ACS); after establishing a TCP session with a Customer Premise Equipment (CPE), the ACS issues a log parameter setting message to the CPE according to an acquired log acquisition message; and the CPE acquires a debugged log according to an acquired log parameter setting message, and reports the debugged log to the IQAS through a UDP message. The disclosure is beneficial to subsequent extension of multiple log ports and capable of supporting simultaneous reporting of operation logs to a log server IQAS by multiple log ports, the method provided by embodiment of the disclosure can be implemented in a flexible way and there are no interferences between the multiple log ports, thus it is possible to implement real-time monitoring of an operation state of a
(Continued)

Customer Premise Equipment (CPE), thereby implementing in-time positioning of a failure in respective modules of the CPE.

8 Claims, 3 Drawing Sheets

(51) Int. Cl.
*H04L 29/08* (2006.01)
*H04L 29/12* (2006.01)

(52) U.S. Cl.
CPC .......... *H04L 43/10* (2013.01); *H04L 61/2514* (2013.01); *H04L 61/2575* (2013.01); *H04L 67/025* (2013.01); *H04L 67/141* (2013.01)

(58) Field of Classification Search
CPC . H04L 67/025; H04L 61/2514; H04L 67/141; H04L 61/2575; H04L 43/10
See application file for complete search history.

(56) References Cited

U.S. PATENT DOCUMENTS

| | | | |
|---|---|---|---|
| 8,843,622 B1* | 9/2014 | Graham | H04L 67/24 370/241 |
| 2002/0108121 A1* | 8/2002 | Alao | H04N 21/812 725/110 |
| 2004/0073658 A1* | 4/2004 | Oran | H04L 29/06 709/224 |
| 2005/0286519 A1* | 12/2005 | Ravikumar | H04L 45/00 370/389 |
| 2006/0230312 A1* | 10/2006 | Nichols | H04L 67/025 714/25 |
| 2009/0092126 A1* | 4/2009 | Flynn | H04L 63/02 370/352 |

FOREIGN PATENT DOCUMENTS

| | | |
|---|---|---|
| CN | 101114932 A | 1/2008 |
| CN | 101170451 A | 4/2008 |
| CN | 102348198 A | 2/2012 |
| CN | 102412999 A | 4/2012 |
| CN | 102413541 A | 4/2012 |
| CN | 102647405 A | 8/2012 |
| EP | 2214382 A1 | 8/2010 |

OTHER PUBLICATIONS

English Translation of the Written Opinion of the International Search Authority in international application No. PCT/CN2013/083247, dated Dec. 19, 2013.

* cited by examiner

METHOD FOR REMOTELY ACQUIRING IN REAL TIME LOG

TECHNICAL FIELD

The disclosure relates to the technical field of communications, and in particular to a method and system for remotely acquiring in real time a log.

BACKGROUND

At present, with the development of IP (Internet Protocol) techniques, Internet becomes increasingly popular and thousands of households can access Internet. Devices for supporting Internet can be divided, according to geographic regions, into several portions including user access, IP bearing and etc.

Specifically, the user access portion typically includes a Customer Premise Equipment (CPE) that mainly includes a Personal Computer (PC) and a Network Address Translator (NAT), and these CPE(s) are managed and maintained by a user, and a device on a IP bearer network side is typically managed and maintained by an operator.

When a CPE is managed and maintained, it is necessary to catch logs from respective modules of the CPE. However, during catching of logs from respective modules of the CPE, existing commonly-used log catching tools are typically required to fill therein with an actual IP address of the CPE. But in existing networks, a CPE is often in a private network, for example located in a home network, where the CPE is connected to a router that is in turn connected to a public network; in this case, existing log catching tools cannot be used to implement catching of logs from respective modules of the CPE.

SUMMARY

In order to solve the problem that existing log catching tools can not be used to implement catching of logs from respective modules of a CPE that is located in a private network, embodiments of the disclosure are intended to provide a method and system for remotely acquiring in real time a log.

To this end, the technical solutions of embodiments of the disclosure are implemented as follows.

A method for remotely acquiring in real time a log, including:

when triggering acquisition of the log, a log server IQAS issues a log acquisition message to an Access Control Server (ACS);

the ACS establishes a TCP session with a Customer Premise Equipment (CPE), and then issues a log parameter setting message to the CPE according to the log acquisition message; and the CPE acquires a debugged log according to the log parameter setting message, and reports the debugged log to the IQAS through a UDP message.

In an embodiment, the log acquisition message issued by the IQAS to the ACS may include: target IP information, port information, log enabling information and log debug level information of a CPE-reported monitoring log.

In an embodiment, before the IQAS triggers acquisition of the log, the method may further include:

after being successfully connected to a network, the CPE initiates a registration request message to the ACS;

the ACS determines, according to the registration request message, whether the CPE is located behind a Network Address Translator (NAT), if yes, after feeding back a registration response message to the CPE, the ACS issues immediately an STUN (Simple Traversal of Udp over Nats)-related parameter to the CPE; wherein the STUN-related parameter is used by the CPE to transmit a keep-alive message to a STUN server, and the STUN-related parameter includes STUN enabling information, address information of the STUN server, port information, maximum time interval information and minimum time interval information for the CPE to transmit a binding request;

after receiving the STUN-related parameter, when determining that the value of the STUN-related parameter changes, the CPE establishes a socket, transmits periodically the binding request to the STUN server, and receives a binding response replied by the STUN server;

wherein the binding request comprises an device ID of the CPE, the binding response replied by the STUN server comprises InformAtOnce that represents whether the CPE is required to initiate immediately informing a reverse connection, when a value of InformAtOnce is "0", it represents that it is not required, and when the value of InformAtOnce is "1", it represents that it is required.

In an embodiment, the step that the ACS issues a log parameter setting message to the CPE according to the log acquisition message may include: the ACS issues the log parameter setting message to the CPE through calling a SetParameterRequest according to the acquired log acquisition message.

In an embodiment, the step that the ACS establishes a TCP session with a CPE may include:

when the IQAS triggers acquisition of the log, the STUN server sets to 1 the value of InformAtOnce in the binding response replied to the CPE, and based on the set value, the CPE initiates a reverse connection request to the ACS so that the TCP session with the ACS is established.

In an embodiment, steps that the CPE acquires a debugged log according to the log parameter setting message and reports the debugged log to the IQAS through a UDP message may include:

after receiving the log parameter setting message, a network management module of the CPE forwards the log parameter setting message to a log distribution module;

the log distribution module enables debugged information of a relevant port of a log module through socket communication, and outputs the debugged log according to the log debug level information issued by the ACS; and after the debugged log is output, the log module reports the debugged log to a relevant target IP and a relevant port of the IQAS through the UDP message according to the target IP information and port information of the CPE-reported monitoring log issued by the ACS.

A system for remotely acquiring in real time a log, including:

a log server IQAS configured to, when triggering acquisition of the log, issue a log acquisition message to an Access Control Server (ACS);

the ACS configured to establish a TCP session with a Customer Premise Equipment (CPE), and then issue a log parameter setting message to the CPE according to the log acquisition message; and the CPE configured to acquire a debugged log according to the log parameter setting message, and report the debugged log to the IQAS through a UDP message.

In an embodiment, the log acquisition message issued by the IQAS to the ACS may include: target IP information, port information, log enabling information and log debug level information of a CPE-reported monitoring log.

In an embodiment, the system for remotely acquiring in real time a log may further include:

an STUN server configured to interact with the CPE;

wherein the CPE is further configured to, after being successfully connected to a network, transmit 1 boot event to the ACS to initiate a registration request message;

accordingly, the ACS is further configured to determine, according to the registration request message, whether the CPE is located behind an NAT, if yes, after feeding back a registration response message to the CPE, issue immediately an STUN-related parameter to the CPE; wherein the STUN-related parameter is used by the CPE to transmit a keep-alive message to a STUN server, and the STUN-related parameter includes STUN enabling information, address information of the STUN server, port information, maximum time interval information and minimum time interval information for the CPE to transmit a binding request;

the CPE is further configured to, after receiving the STUN-related parameter and when determining that the value of the STUN-related parameter changes, establish a socket, transmit periodically the binding request to the STUN server, and receive a binding response replied by the STUN server;

wherein the binding request comprises an device ID of the CPE, the binding response replied by the STUN server comprises InformAtOnce that represents whether the CPE is required to initiate immediately informing a reverse connection, when a value of InformAtOnce is "0", it represents that it is not required, and when the value of InformAtOnce is "1", it represents that it is required.

In an embodiment, the ACS configured to issue a log parameter setting message to the CPE according to the log acquisition message may include:

the ACS issues the log parameter setting message to the CPE through calling a SetParameterRequest according to the acquired log acquisition message.

In an embodiment, the step that the ACS establishes a TCP session with a CPE may include:

when the IQAS triggers acquisition of the log, the STUN server sets to 1 the value of InformAtOnce in the binding response replied to the CPE, and based on the set value, the CPE initiates a reverse connection request to the ACS so that the TCP session with the ACS is established.

In an embodiment, the CPE may include:

a network management module configured to, after receiving the log parameter setting message, forward the log parameter setting message to a log distribution module;

the log distribution module configured to, after receiving the log parameter setting message, enable debugged information of a relevant port of a log module through socket communication, and output the debugged log according to the log debug level information issued by the ACS; and the log module configured to, after outputting the debugged log, report the debugged log to a relevant target IP and a relevant port of the IQAS through the UDP message according to the target IP information and port information of the CPE-reported monitoring log issued by the ACS.

The embodiments of the disclosure are beneficial to subsequent extension of multiple log ports and capable of supporting simultaneous reporting of operation logs to a log server IQAS by multiple log ports, the method provided by embodiment of the disclosure can be implemented in a flexible way and there are no interferences between the multiple log ports, thus it is possible to implement real-time monitoring of the operation state of the CPE, thereby implementing in-time positioning of a failure in respective modules of the CPE.

Figure 1:
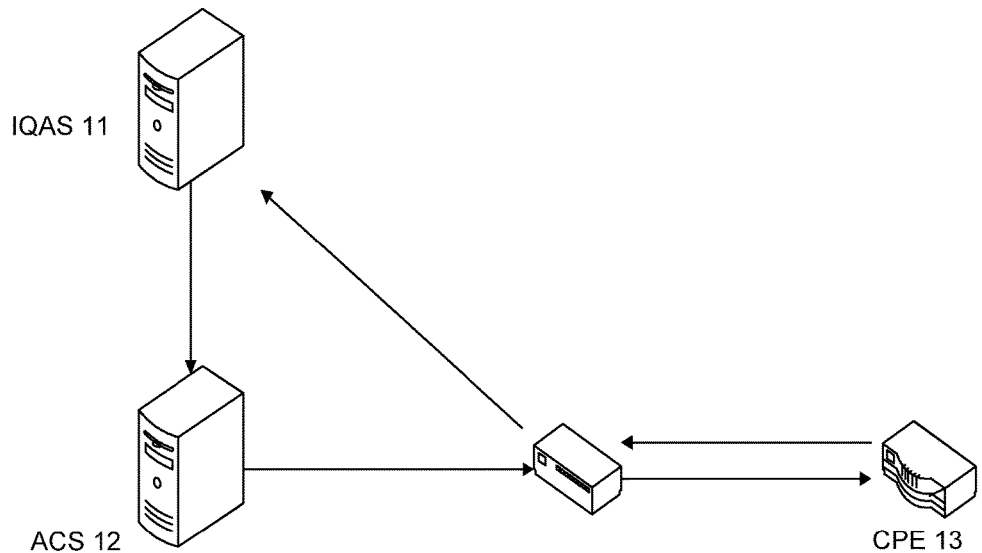
FIG. 1 is a schematic diagram showing networking of a system for remotely acquiring in real time a log according to an embodiment of the disclosure.

The implementation of objectives of the disclosure, its functional characteristics and beneficial effects will be further described below in combination with specific embodiments and accompanying drawings.

DETAILED DESCRIPTION

The technical solutions of the disclosure will be further elaborated below in combination with specific embodiments and accompanying drawings so that those skilled in the art can better understand the disclosure and put it into practice, but the embodiments given herein are not intended to limit the disclosure.

When a Customer Premise Equipment (CPE) is behind a gateway and an Access Control Server (ACS) and a log server IQAS are beyond the gateway, after NAT traversal, a log initiated actively by the ACS is required to acquire a request message so that it can reach the CPE.

In the embodiment of the disclosure, through setting, at the IQAS, of a log transmission enabling function, a log level modification function and a log disabling function, the NAT traversal is implemented based on the TR069 protocol and implemented by referencing to the principle of NAT traversal based on the STUN protocol and the the TR-111 protocol; specifically, the TR069 protocol is a simplified and optimized version of the TR-111 protocol, and based on the TR069 protocol, any NAT gateway can be traversed, and the TR069 protocol has no assumption and dependence on existing NAT gateway.

In an embodiment of the disclosure, a log catching command is issued by an ACS, private network traversing is implemented by a network management module of the CPE. Content of communication messages between the CPE and the ACS are simplified to the minimum extent so that requirements for NAT traversing can be met and in the mean while a highest communication efficiency can be guaranteed. Since the message of the log catching command does not carry corresponding address mapping information, whether the CPE is on an LAN side of the NAT is analyzed and determined by ACS.

Specifically, an embodiment of the disclosure provides a method for remotely acquiring in real time a log, which includes the following steps:

step A, after being connected successfully to a network, a network management module in a CPE initiates actively a registration message to an ACS, and transmits 1 boot event.

Step B, the ACS determines whether the CPE is located behind a Network Address Translator (NAT), if yes, after feeding back a registration response message to the CPE, the ACS issues immediately to the CPE an STUN-related parameter that is used for the CPE to transmit a keep-alive message to an STUN server;

wherein the STUN-related parameter includes STUN enabling information, address information of the STUN server, port information, maximum time interval information and minimum time interval information for the CPE to transmit a binding request.

Step C, during processing of the STUN-related parameter, when determining that the value of the STUN-related parameter changes, the CPE begins to call an STUN module, establishes a socket, transmits periodically a binding request to the STUN server, and receives a binding response replied by the STUN server.

Specifically, a content parameter included in the binding request initiated by the CPE includes a device ID of the CPE.

The message format of the binding response replied by the STUN server is as same as the message format of the binding request, the stored parameter in the binding response only includes InformAtOnce that is used to represent whether the CPE is required to initiate a reverse connection, when the value of InformAtOnce is "0", it represents that it is not required, and when the value of InformAtOnce is "1", it represents that it is required.

Step D: when triggering acquisition of the log, a log server IQAS issues a log acquisition message to the ACS;

wherein the log acquisition message includes target IP information, port information, log enabling information and log debug level information of a CPE-reported monitoring log.

Step E, the ACS issues again the log parameter setting message to the CPE through calling a SetParameterRequest, and the network management module of the CPE receives and processes the log acquisition message.

In practical implementation, the CPE is located on a private network while the ACS is located in a public network, and there is always a keep-alive or heartbeat processing therebetween.

Here, when the ACS actively issues the log parameter setting message to the CPE (e.g., a set top box of an IPTV), the STUN server is required to set to 1 the value of the parameter InformAtOnce in the binding response replied to the CPE, and issue the binding response.

After receiving such a binding response, the CPE initiates a reverse connection so as to receive and process the log parameter setting message issued by the ACS.

Step F, when receiving the log parameter setting message, the network management module of the CPE forwards the log parameter setting message to a log distribution module, and the log distribution module enables debugged information of a relevant port of a log module through socket communication, and outputs the debugged log according to the log debug level information issued by the ACS;

Step G, after the debugged log is output, the log module reports the debugged, through a UDP message, the debugged log to a target IP and a targe port specified when the IQAS issues the debugged log.

Step H, after receiving a CPE-reported monitoring log, the IQAS saves it for subsequent query.

In this way, it is possible to monitor remotely the operation state of the CPE in a public network environment, observe in real time operation performance of the CPE, and position a failure occurred during operation of the CPE.

The implementation process of the method for remotely acquiring a log provided by the embodiments of the disclosure will be elaborated below according to specific embodiments and accompanying drawings.

FIG. 1 is a schematic diagram showing networking of a system for remotely acquiring in real time a log according to an embodiment of the disclosure, and shows specifically a network environment for practical operation. IQAS 11 and ACS 12 are located on the outward side of a gateway and in a public network environment. CPE 13, e.g., a set top box of an IPTV is located on the inward side of the gateway and in a private network environment. Then the set top box of the IPTV can transmit actively a message to ACS 12 and IQAS 11. when IQAS 11 and AS 12 need to issue actively a message to the set top box of the IPTV, they are required to always keep NAT heartbeat to keep alive.

Specifically, the system for remotely acquiring in real time a log may further include:

a log server IQAS 11 configured to, when triggering acquisition of the log, issue a log acquisition message to an Access Control Server (ACS) 12;

the ACS 12 configured to establish a TCP session with a Customer Premise Equipment (CPE), and then issue a log parameter setting message to the CPE 13 according to an acquired log acquisition message; and the CPE 13 configured to acquire a debugged log according to the acquired log parameter setting message, and report the debugged log to the IQAS 11 through a UDP message.

Specifically, the log acquisition message issued by the IQAS to the ACS includes: target IP information, port information, log enabling information and log debug level information of a CPE-reported monitoring log.

Specifically, the system for remotely acquiring in real time a log may further include:

an STUN server 14 (not shown in FIG. 1) configured to interact with the CPE 13; wherein the CPE 13 is further configured to, after being successfully connected to a network, transmit 1 boot event to the ACS 12 so as to initiate a registration request message; the ACS determines based on the registration request message whether the CPE 13 is behind the NAT, if yes, after feeding back a registration response message to the CPE 13, the ACS issues immediately to the CPE 13 an STUN-related parameter that is used for the CPE 13 to transmit a keep-alive message to the STUN server.

wherein the STUN-related parameter includes STUN enabling information, address information of the STUN server, port information, maximum time interval information and minimum time interval information for the CPE to transmit a binding request;

Preferably, after acquiring the STUN-related parameter and when determining that the value of the STUN-related parameter changes, the CPE establishes a socket, transmits periodically a binding request to the STUN server, and receives a binding response replied by the STUN server wherein the binding request initiated by the CPE includes an device ID of the CPE, the binding response replied by the STUN server comprises InformAtOnce that represents whether the CPE is required to initiate immediately informing a reverse connection, when a value of InformAtOnce is "0", it represents that it is not required, and when the value of InformAtOnce is "1", it represents that it is required.

Specifically, after establishing a TCP session with the CPE, the ACS issues the log parameter setting message to the CPE through calling a SetParameterRequest according to the acquired log acquisition message.

Specifically, the step that the ACS establishes a TCP session with a CPE may include:

when the IQAS triggers acquisition of the log, the STUN server sets to 1 the value of InformAtOnce in the binding response replied to the CPE, and based on the set value, the CPE initiates a reverse connection request to the ACS so that the TCP session with the ACS is established.

Figure 2:
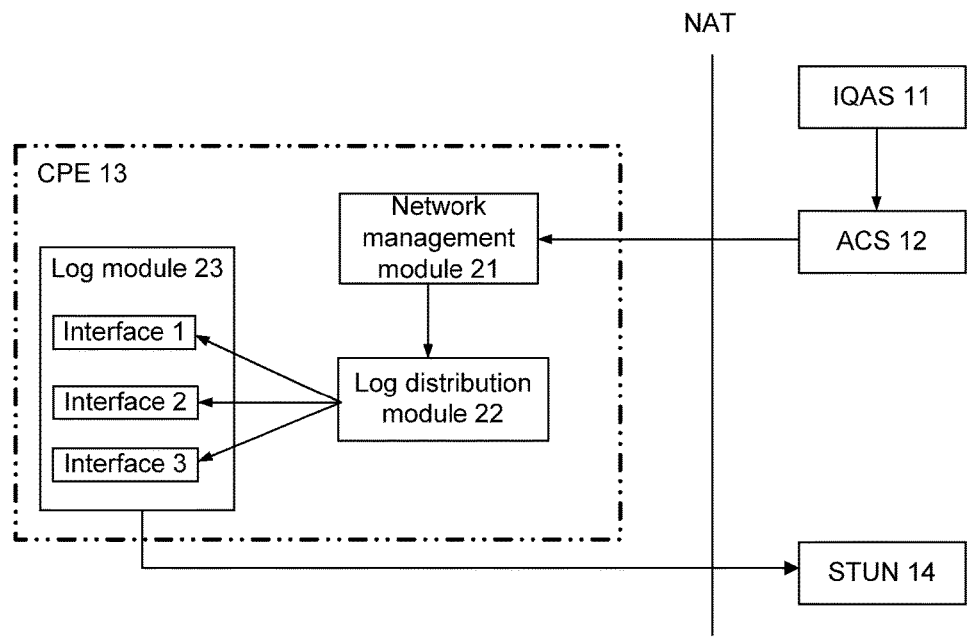
FIG. 2 is a schematic structural diagram of a CPE provided by an embodiment of the disclosure.

FIG. 2 is a schematic structural diagram of a CPE provided by an embodiment of the disclosure, and CPE 13 includes mainly a network management module 21, a log distribution module 22 and a log module 23;

the log module 23 takes responsible for outputting of operation logs of respective modules; message communication between the log distribution module 22 and the log module 23 is performed through socket communication and a UDP signaling. The log module 23 outputs the operation log and uploads it to the IQAS, and the communication therebetween is socket communication and UDP messaging.

Specifically, the CPE may include:

a network management module 21 configured to, after receiving the log parameter setting message, forward the log parameter setting message to a log distribution module 22;

the log distribution module 22 configured to, after acquiring the log parameter setting message, enable debugged information of a relevant port of a log module 23 through socket communication, and output the debugged log according to the log debug level information issued by the ACS; and the log module 23 configured to, after outputting the debugged log, report the debugged log to a relevant target IP and a relevant port of the IQAS through the UDP message according to the target IP information and port information of the CPE-reported monitoring log issued by the ACS.

The above network management module 21, log distribution module 22 and log module 23 can be implemented by a Central Processing Unit (CPU), a Digital Signal Processor (DSP) or a Field-Programmable Gate Array (FPGA) in the CPE 13.

Figure 3:
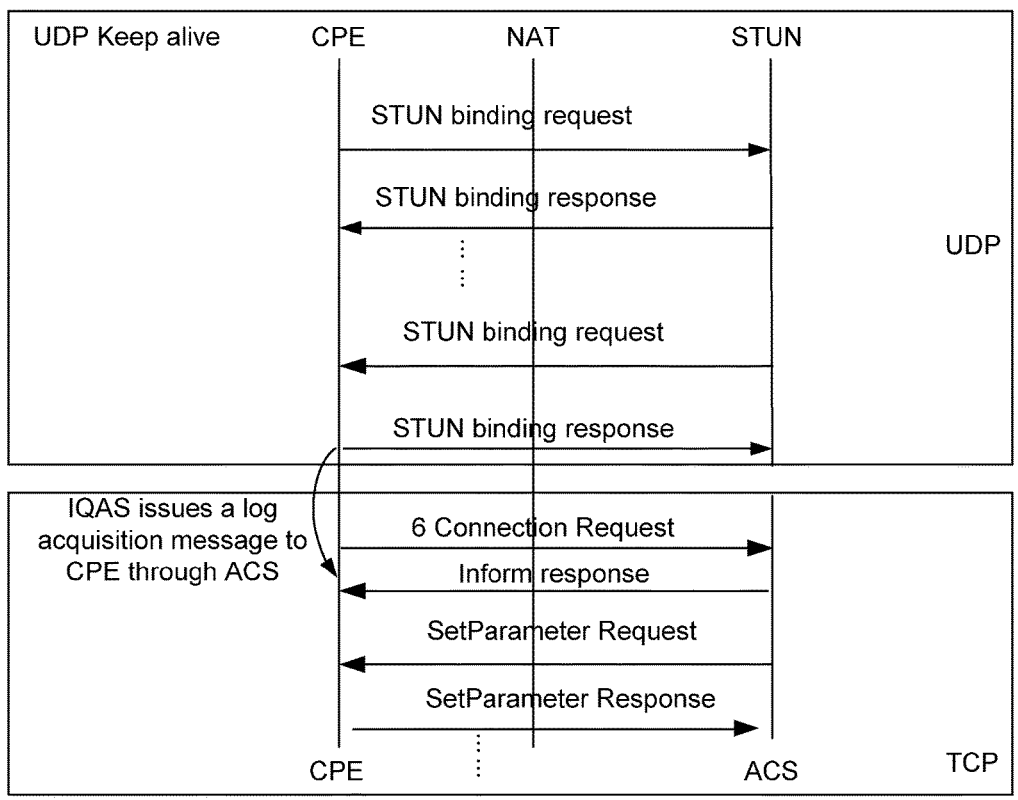
FIG. 3 is a flow chart of performing NAT traversal using a proprietary protocol according to an embodiment of the disclosure.

FIG. 3 is a flow chart of performing traversal using a proprietary protocol, and shows an interactive process for establishing keep-alive and an interactive process in issuing a log command. when a CPE is launched, a binding request is transmitted periodically to an STUN server, with the content of the request being an ID of the CPE, and the STUN server replies with a binding response with the content being InformAtOnce. This portion is through UDP communication.

When acquisition of a log is triggered on the IQAS, the value of InformAtOnce in the keep-alive response replied by the STUN server is 1, after receiving it and performing a determination, the CPE initiates immediately a reverse connection request to the ACS so as to establish a TCP session with the ACS, then the ACS issues, through the TCP session, a message set by the log command.

Figure 4:
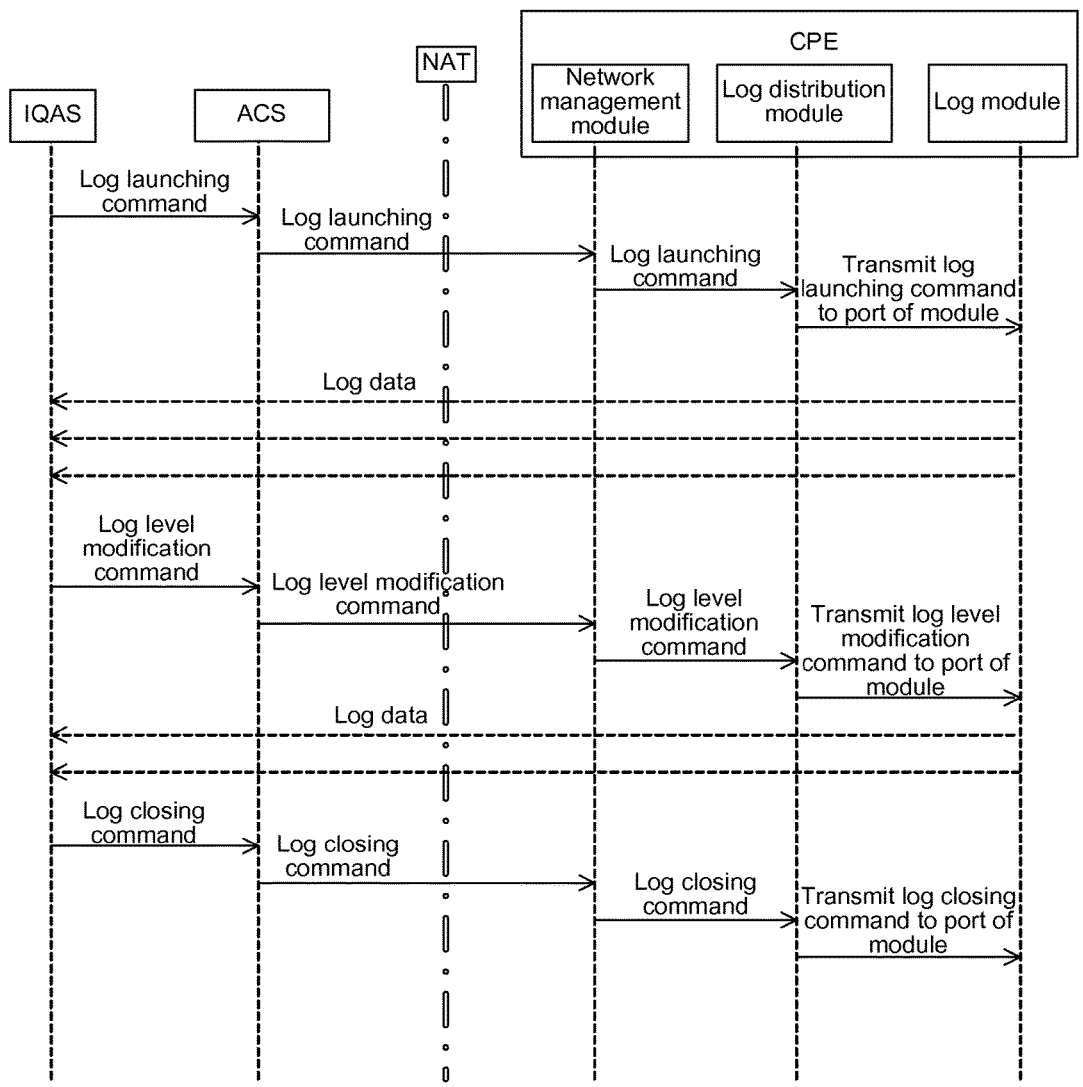
FIG. 4 is a specific flow chart showing implementation of log acquisition according to an embodiment of the disclosure.

FIG. 4 is a specific flow chart showing implementation of log acquisition, which shows processes of launching a log, modifying log level and closing the log. There are differences in issued commands between different processes, which are shown as follows.

A, Launching a log Command parameters issued in launching the log include an IP a server receiving the log, a port of the server receiving the log, an enabling switch (1), log port and debug level. A log distribution module forwards a command for launching a log to a log module, and then the log module begins to output an operation log, and reports. in real time, log data to a log system.

B, Modifying log level The log level of a launched log module is modified. There are 32 debug levels that are represented by a 32-bit character string with one bit representing one debug level. 1 represents a corresponding level is enabled, and 0 represents the level is disabled. Command parameters issued include an enabling switch (2), log port and debug level. The log distribution module forwards a command for modifying the log level to the log module, and then the log module immediately updates a level of an output operation log, and outputs, according to a new debug level, a log and reports it to the log system.

C, Closing the log When a launched log module is required to be closed, command parameters issued include an enabling switch (0), log port and debug level. The log distribution module forwards a command for closing the log to the log module, and then the log module disables the outputting of the operation log, thus no reporting is performed until the log reporting function is enabled once again.

The embodiments of the disclosure are beneficial to subsequent extension of multiple log ports and capable of supporting simultaneous reporting of operation logs to a log server IQAS by multiple log ports, the method provided by embodiment of the disclosure can be implemented in a flexible way and there are no interferences between the multiple log ports, thus it is possible to implement real-time monitoring of the operation state of the CPE, thereby implementing in-time positioning of a failure in respective modules of the CPE.

What described are merely preferable embodiments of the disclosure, and are not intended to limit the scope of protection of the disclosure. All equivalent structures and flow changes made using the specification and accompanying drawings of the disclosure, or direct or indirect applications of the disclosure to other related technical fields should be included within the scope of protection of the disclosure.

INDUSTRIAL APPLICABILITY

In the embodiments of the disclosure, an IQAS issues a log acquisition message to an Access Control Server (ACS); after establishing a TCP session with a Customer Premise Equipment (CPE), the ACS issues a log parameter setting message to the CPE according to an acquired log acquisition message; and the CPE acquires a debugged log according to an acquired log parameter setting message, and reports the debugged log to the IQAS through a UDP message. The embodiments of the disclosure can solve the problem that existing log catching tools cannot be used to implement catching of logs from respective modules of a CPE that is located in a private network, and support simultaneous reporting of operation logs to a log server IQAS by multiple log ports, the method provided by embodiment of the disclosure can be implemented in a flexible way and there are no interferences between the multiple log ports.

The invention claimed is:

1. A method for remotely acquiring in real time a log, comprising:

when triggering acquisition of the log, a log server issues a log acquisition message to an Access Control Server (ACS);

establishing, by the ACS, a Transmission Control Protocol (TCP) session with a Customer Premise Equipment (CPE), and then issuing a log parameter setting message to the CPE according to the log acquisition message; and acquiring, by the CPE, a debugged log according to the log parameter setting message, and reporting the debugged log to the log server through a User Datagram Protocol (UDP) message, wherein the log acquisition message issued by the log server to the ACS comprises: target IP information, port information, log enabling information and log debug level information of a CPE-reported monitoring log;

the method further comprising, before the log server triggers acquisition of the log, after being successfully connected to a network, initiating, by the CPE, a registration request message to the ACS;

determining according to the registration request message, whether the CPE is located behind a Network Address Translator (NAT), if yes, after feeding back a registration response message to the CPE, issuing immediately, by the ACS, an STUN-related parameter to the CPE;

wherein the Simple Traversal of Udp Over Nats (STUN)-related parameter is used by the CPE to transmit a keep-alive message to a STUN server, and the STUN-related parameter comprises STUN enabling information, address information of the STUN server, port information, maximum time interval information and minimum time interval information for the CPE to transmit a binding request;

after receiving the STUN-related parameter, when determining that the value of the STUN-related parameter changes, establishing, by the CPE, a socket, transmitting periodically the binding request to the STUN server, and receiving a binding response replied by the STUN server;

wherein the binding request comprises an device ID of the CPE, the binding response replied by the STUN server comprises InformAtOnce that represents whether the CPE is required to initiate immediately informing a reverse connection, when a value of InformAtOnce is "0", it represents that it is not required, and when the value of InformAtOnce is "1", it represents that it is required.

2. The method according to claim 1, wherein the issuing, by the ACS, a log parameter setting message to the CPE according to the log acquisition message comprises:

issuing, by the ACS, the log parameter setting message to the CPE through calling a SetParameterRequest according to the acquired log acquisition message.

3. The method according to claim 2, wherein the establishing, by the ACS, a TCP session with a CPE comprises:

when the log server triggers acquisition of the log, the STUN server sets to 1 the value of InformAtOnce in the binding response replied to the CPE, and based on the set value, the CPE initiates a reverse connection request to the ACS so that the TCP session with the ACS is established.

4. The method according to claim 1, wherein the acquiring, by the CPE, a debugged log according to the log parameter setting message and the reporting the debugged log to the log server through a UDP message comprise:

after receiving the log parameter setting message, forwarding, by a network management module of the CPE, the log parameter setting message to a log distribution module;

the log distribution module enables debugged information of a relevant port of a log module through socket communication, and outputs the debugged log according to the log debug level information issued by the ACS; and after the debugged log is output, reporting, by the log module, the debugged log to a relevant target IP and a relevant port of the log server through the UDP message according to the target IP information and port information of the CPE-reported monitoring log issued by the ACS.

5. A system for remotely acquiring in real time a log, comprising:

a log server configured to, when triggering acquisition of the log, issue a log acquisition message to an Access Control Server (ACS);

the ACS configured to establish a Transmission Control Protocol (TCP) session with a Customer Premise Equipment (CPE), and then issue a log parameter setting message to the CPE according to the log acquisition message; and the CPE configured to acquire a debugged log according to the log parameter setting message, and report the debugged log to the log server through a User Datagram Protocol (UDP) message, wherein the log acquisition message issued by the log server to the ACS comprises: target IP information, port information, log enabling information and log debug level information of a CPE-reported monitoring log;

the system further comprising:

an STUN server configured to interact with the CPE;

wherein the CPE is further configured to, after being successfully connected to a network, initiate a registration request message to the ACS;

wherein the ACS is further configured to determine, according to the registration request message, whether the CPE is located behind a Network Address Translator (NAT), if yes, after feeding back a registration response message to the CPE, issue immediately an STUN-related parameter to the CPE;

wherein the Simple Traversal of Udp Over Nats (STUN)-related parameter is used by the CPE to transmit a keep-alive message to a STUN server, and the STUN-related parameter comprises STUN enabling information, address information of the STUN server, port information, maximum time interval information and minimum time interval information for the CPE to transmit a binding request;

wherein the CPE is further configured to, after receiving the STUN-related parameter and when determining that the value of the STUN-related parameter changes, establish a socket, transmit periodically the binding request to the STUN server, and receive a binding response replied by the STUN server;

wherein the binding request comprises an device ID of the CPE, the binding response replied by the STUN server comprises InformAtOnce that represents whether the CPE is required to initiate immediately informing a reverse connection, when a value of InformAtOnce is "0", it represents that it is not required, and when the value of InformAtOnce is "1", it represents that it is required.

6. The system according to claim 5, wherein the ACS configured to issue a log parameter setting message to the CPE according to the log acquisition message comprises:

the ACS is configured to issue the log parameter setting message to the CPE through calling a SetParameterRequest according to the acquired log acquisition message.

7. The system according to claim 6, wherein the ACS establishing a TCP session with a CPE comprises:

when the log server triggers acquisition of the log, the STUN server sets to 1 the value of InformAtOnce in the binding response replied to the CPE, and based on the set value, the CPE initiates a reverse connection request to the ACS so that the TCP session with the ACS is established.

8. The system according to claim 5, wherein the CPE comprises:

a network management module configured to, after receiving the log parameter setting message, forward the log parameter setting message to a log distribution module;

the log distribution module configured to, after receiving the log parameter setting message, enable debugged information of a relevant port of a log module through socket communication, and output the debugged log according to the log debug level information issued by the ACS; and the log module configured to, after outputting the debugged log, report the debugged log to a relevant target IP and a relevant port of the log server through the UDP message according to the target IP information and port information of the CPE-reported monitoring log issued by the ACS.

* * * * *